United States Patent
Golov

(10) Patent No.: US 11,984,033 B2
(45) Date of Patent: May 14, 2024

(54) ARTIFICIAL INTELLIGENCE-BASED PERSISTENCE OF VEHICLE BLACK BOX DATA

(71) Applicant: Micron Technology, Inc., Boise, ID (US)

(72) Inventor: Gil Golov, Backnang (DE)

(73) Assignee: Micron Technology, Inc., Boise, ID (US)

(*) Notice: Subject to any disclaimer, the term of this patent is extended or adjusted under 35 U.S.C. 154(b) by 462 days.

(21) Appl. No.: 16/783,377

(22) Filed: Feb. 6, 2020

(65) Prior Publication Data

US 2021/0245659 A1 Aug. 12, 2021

(51) Int. Cl.
| | | |
|---|---|---|
| G08G 1/16 | (2006.01) | |
| B60Q 9/00 | (2006.01) | |
| G06N 3/04 | (2023.01) | |
| G06N 3/08 | (2023.01) | |
| G07C 5/00 | (2006.01) | |

(52) U.S. Cl.
CPC ............. *G08G 1/163* (2013.01); *B60Q 9/008* (2013.01); *G06N 3/04* (2013.01); *G06N 3/08* (2013.01); *G07C 5/008* (2013.01)

(58) Field of Classification Search
CPC . B06Q 9/008; G06N 3/04; G06N 3/08; G07C 5/008
See application file for complete search history.

(56) References Cited

U.S. PATENT DOCUMENTS

| | | | |
|---|---|---|---|
| 9,457,754 B1 * | 10/2016 | Christensen | ........ B60R 21/0132 |
| 9,977,432 B1 * | 5/2018 | Cutler | ................... B64C 39/024 |
| 10,752,239 B2 | 8/2020 | Duan et al. | |
| 2008/0147267 A1 | 6/2008 | Plante et al. | |
| 2010/0268423 A1 * | 10/2010 | Breed | ................... B60N 2/002 |
| | | | 701/45 |
| 2015/0310676 A1 | 10/2015 | Lambert et al. | |
| 2018/0237005 A1 | 8/2018 | Duan et al. | |
| 2018/0293449 A1 | 10/2018 | Sathyanarayana et al. | |
| 2018/0322413 A1 * | 11/2018 | Yocam | .................... G06N 20/00 |
| 2019/0220011 A1 | 7/2019 | Della Penna | |
| 2019/0228596 A1 | 7/2019 | Mondello et al. | |
| 2019/0302744 A1 | 10/2019 | Monti et al. | |
| 2020/0017114 A1 * | 1/2020 | Santoni | ............... G06F 11/2028 |
| 2020/0057894 A1 * | 2/2020 | Sambo | ....................... G06T 7/20 |
| 2020/0057896 A1 * | 2/2020 | Pohl | ...................... G05D 1/0214 |
| 2020/0118359 A1 * | 4/2020 | Sato | ......................... H04W 4/38 |
| 2020/0202144 A1 * | 6/2020 | Porter | ....................... G06N 3/08 |

OTHER PUBLICATIONS

Vertical Leap, "Recovering Data from Black Boxes", Jan. 12, 2015, Ontrack, https://www.ontrack.com/en-GB/blog/recovering-data-black-boxes (Year: 2015).*
International Search Report and Written Opinion, PCT/US2021/016403, dated Apr. 27, 2021.

* cited by examiner

*Primary Examiner* — Dale W Hilgendorf
*Assistant Examiner* — Hana Lee
(74) *Attorney, Agent, or Firm* — Greenberg Traurig

(57) ABSTRACT

The disclosed embodiments are directed to improving the persistence of pre-accident data in vehicles. In one embodiment a method is disclosed comprising receiving events broadcast over a vehicle bus; classifying the events using a machine learning model, the classifying comprising indicating that a collision is imminent; and copying data from a cyclic buffer of a black box device into a long-term storage device in response to the classifying.

14 Claims, 5 Drawing Sheets

ARTIFICIAL INTELLIGENCE-BASED PERSISTENCE OF VEHICLE BLACK BOX DATA

FIELD OF THE TECHNOLOGY

The disclosed embodiments are directed towards automotive systems and to systems for adjusting the operations of vehicle electronic data recorder devices (also known as black box devices) based on a machine learning (ML) model that predicts potential collisions or other situations requiring increased data persistence.

BACKGROUND

In the United States, vehicles are involved in approximately six million collisions each year. Many such vehicles are equipped with event data recorder (EDR) devices, also referred to as black boxes. These devices record data generated by the vehicle such as speed data, control data (e.g., use of turn signals), and other data. Generally, black boxes in automobiles only record a limited duration of data (e.g., a few minutes) in a cyclic buffer. In this scenario, the black box continuously overwrites the oldest data with new data as time progresses. Such devices are statically configured and operated consistently regardless of the operation of the vehicle. Thus, current black boxes can frequently fail to capture significant data that occurs outside the device's recording "window."

While such a configuration may prove useful for identifying data occurring just before a collision, they fail to capture relevant data leading up to a collision. In addition to the foregoing, all automotive devices are constrained by space and power concerns. Thus, it is not practical to simply record all possible data while a vehicle is in motion. Such a naïve approach would require significant power and storage space, requirements that are not feasible in current automobiles.

The disclosed embodiments solve these and other technical problems by providing a machine learning-based method for intelligently persisting black box data after predicting a collision may occur.

BRIEF DESCRIPTION OF THE DRAWINGS

The embodiments are illustrated by way of example and not limitation in the figures of the accompanying drawings in which like references indicate similar elements.

DETAILED DESCRIPTION

The disclosed embodiments describe devices, methods, and computer-readable media for persisting black box data using a machine learning (ML) model. In the illustrated embodiments, a trained ML mode is installed in a vehicle and monitors event data broadcast in the vehicle. The ML model classifies these event data points and determines whether the event data indicates that a collision is likely. If so, the method begins copying data from a cyclic buffer of a black box, thus persisting the black box data significantly in advance of a collision as compared to current black boxes. Additionally, disclosed are techniques for improving the performance of the ML model based on accumulated data during operation of the foregoing process.

Figure 1:
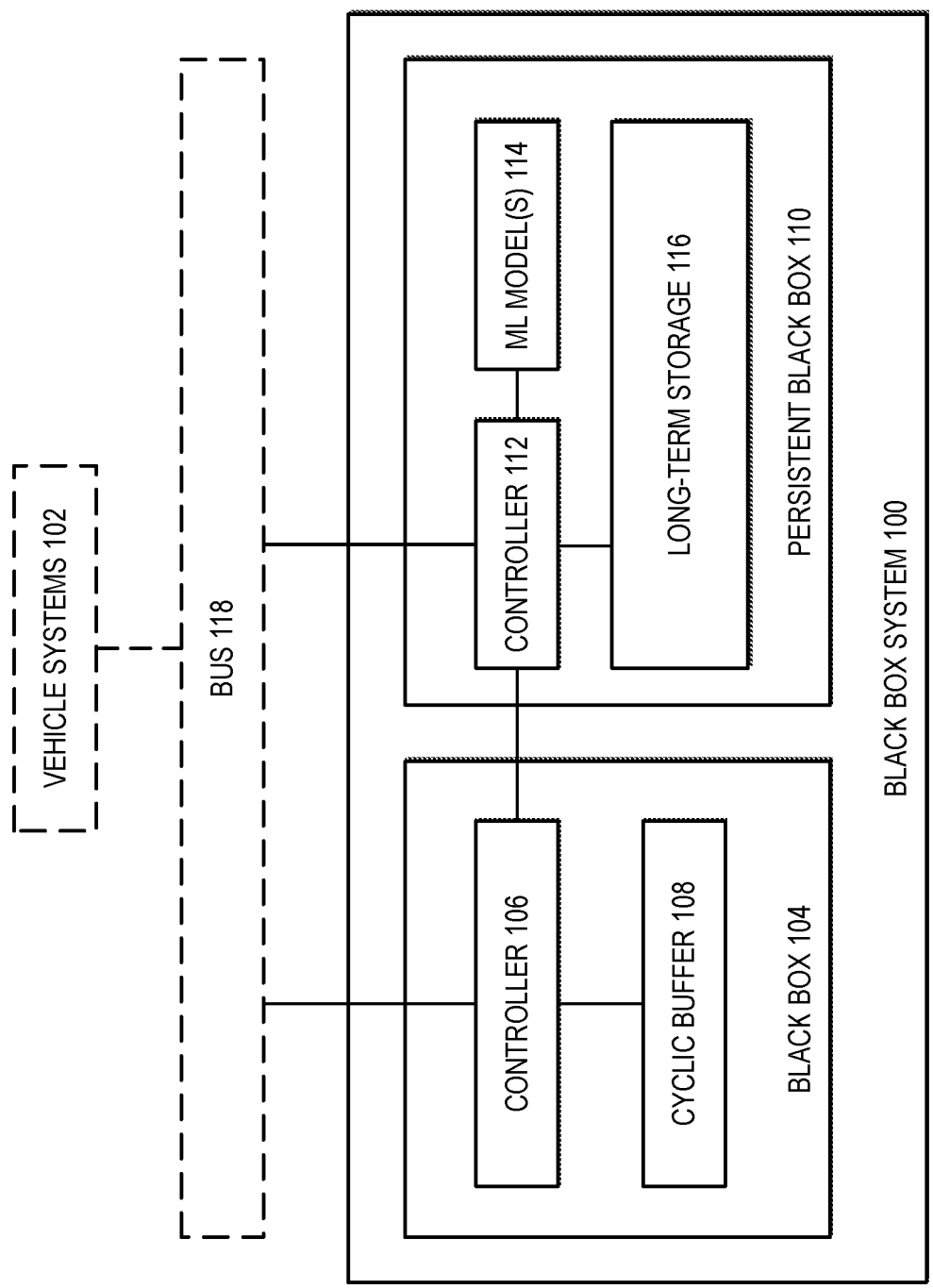
FIG. 1 is a block diagram illustrating a black box system according to some embodiments of the disclosure.

FIG. 1 is a block diagram illustrating a black box system according to some embodiments of the disclosure.

In the illustrated embodiment, a black box system (100) and vehicle systems (102) are connected to a bus (118). Details of types of vehicle systems (102) and the bus (118) are provided in FIG. 5 and are not repeated herein. Generally, the vehicle systems (102) transmit events or data relating to the operation of the vehicle over the bus (118).

In the illustrated embodiment, a black box system (100) includes a traditional black box (104) and a persistent black box (110). In the illustrated embodiment, the black box (104) can comprise any type of standard black box hardware currently used in vehicles. In other embodiments, the black box (104) can be provided specifically as part of the black box system (100) installed in a vehicle. In this manner, the persistent black box (110) can be used to retrofit existing black boxes whereas in new production, the entire black box system (100) can be installed in the vehicle.

The illustrated black box (104) includes a controller (106) and cyclic buffer (108). The controller (106) monitors the bus (118) for relevant events and stores these events in the cyclic buffer (108). In one embodiment, the controller (106) forwards all detected events in the cyclic buffer (108). In other embodiments, the controller (106) may selectively enable and disable recording events into the cyclic buffer (108). For example, in some systems, the controller (106) may only record data into the cyclic buffer upon detecting a collision (e.g., when air bags are deployed, collision sensors are triggered, or when another electronic control unit, ECU, indicates a collision). As one example, the controller (106) may only record data when an antilock braking system (ABS) is activated, which often precedes an accident.

The cyclic buffer (108) comprises a storage device that is configured to store data in a logical ring. That is, if the first location written to is the first location in the buffer (108), the controller (106) continues to write data at sequential locations in the buffer (108). Upon reaching the end of the buffer (108), the controller (106) then overwrites the first location of the buffer (108) and continues overwriting data, thus simulating a ring-like structure. The controller (106) can start writing at any location in the buffer (108) but always writes sequentially, wrapping around to the front of the buffer (108) when reaching the end of the buffer (108). Specifically, operating details of cyclic buffers are known in the art and those details are not repeated herein.

In current vehicles, the black box (104), bus (118), and vehicle systems (102) may be present and record limited amounts of data in the cyclic buffer (108). However, as illustrated in the improved system of FIG. 1, an improved black box system (100) is equipped with a persistent black box (PBB) (110). The PBB (110) includes its own controller (112), one or more ML models (114), and a long-term storage (LTS) (116). In one embodiment, the controller (112) can comprise a system-on-a-chip, dedicated microprocessor, microcontroller, field-programmable gate array, or other processing element. The controller (112) may include firmware that controls the device and acts as an operating system. The ML models (114) are generally stored in persistent memory. In some embodiments, the ML models (114) are stored on Flash storage or similar storage. In other embodiments, the ML models (114) can be stored on electrically-erasable programmable read-only memory (EE-PROM). The specific storage type is not limiting so long as the storage persistently stores the models. The long-term storage (116), similarly, comprises a persistent storage medium that maintains data after losing power. In some embodiments, the LTS (116) comprises a secure memory device that is tamper-proof. In some embodiments, the LTS (116) includes significant error correction capabilities to recover from severe data loss (e.g., due to a collision).

In the illustrated embodiment, the controller (112) receives events from the bus (118). Thus, in the illustrated embodiment, the controller (112) processes the same events processed by the black box (104). In the illustrated embodiment, the controller (112) receives events over an interface and inputs the events into an ML model (114). In some embodiments, the controller (112) can window the events and provide multiple events as input to the ML model (114). In some embodiments, the controller (112) executes the ML model and retrieves the parameters defining the model from the ML model (114).

In other embodiments, the ML model (114) can comprise a dedicated artificial intelligence (AI) processor such as a tensor processing unit (TPU) or another AI accelerator. In this embodiment, the controller (112) transmits the input data (vehicle events) to the AI accelerator which performs classification operations.

In either scenario, the controller (112) receives a classification of the event data as either indicative of a potential accident or collision or not. As used herein an "accident" refers to any event where access to event data may be useful such as vehicular collisions, system failures, or other conditions. In some embodiments, this classification is binary. In other embodiments, it may be a continuous value representing the likelihood of an accident occurring based on the underlying data. As will be described, the ML models may comprise neural networks or similar types of machine learning models that are trained using event data occurring before an accident. Additionally, the ML models can be trained using event data that does not occur before an accident. Thus, event data such as acceleration and braking patterns, ECU alerts, and other data can be holistically treated as training data and used to generate a generic model for classifying all event data.

When the controller (112) receives an indication that an accident is likely, the controller (112) begins writing event data to the LTS (116). In one embodiment, the controller (112) copies event data from the bus (118) directly to the LTS (116).

In other embodiments, the controller (112) may access the data stored in cyclic buffer (108) via controller (106). In this embodiment, the PBB (110) eschews adding complexity in filtering event data and instead attempts to leverage the functionality of the controller (106). That is, black box (104) may be preconfigured to process only relevant data to the cyclic buffer (108). Thus, the controller (112) can "sniff" this data and store the data to LTS (116), reducing the workload of the controller (112) and PBB (110). In other embodiments, the controller (106) is configured to "flush" the cyclic buffer (108) to the controller (112) (and ultimately to LTS 116) when it detects that it is about to overwrite data in the buffer (108).

In any scenario, the resulting data in the LTS (116) comprises event data occurring before a predicted accident. The aforementioned operations, and others, are described more fully in the description of FIGS. 2 through 4.

Figure 2:
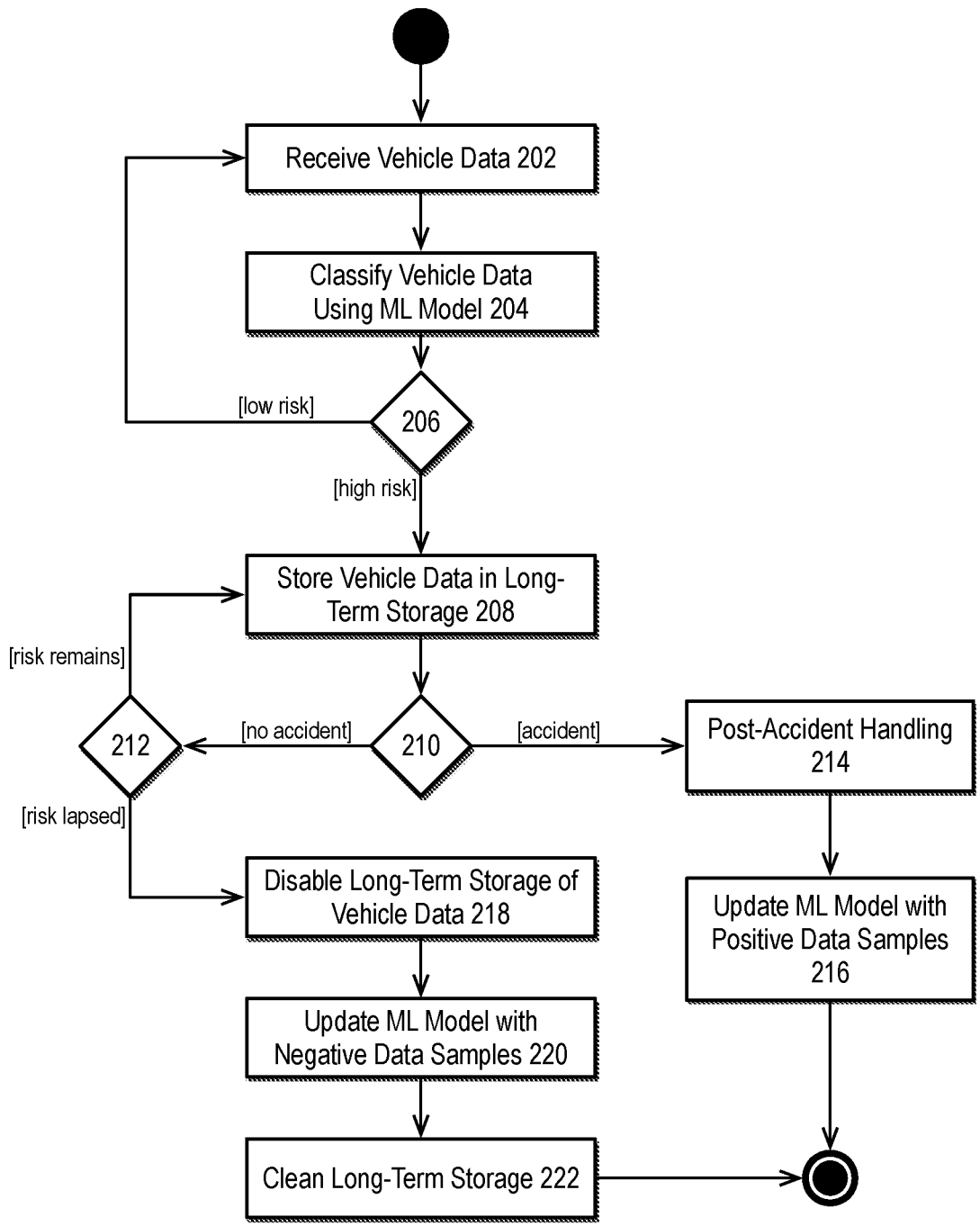
FIG. 2 is a flow diagram illustrating a method for persisting vehicle event data based on a predicted collision according to some embodiments of the disclosure.

FIG. 2 is a flow diagram illustrating a method for persisting vehicle event data based on a predicted collision according to some embodiments of the disclosure. In the illustrated embodiment, the method may be performed entirely by a controller of a persistent black box device (as described in FIG. 1). In other embodiments, certain blocks may be performed by a central server, as will be indicated in the following description.

In block 202, the method receives vehicle data.

In the illustrated embodiment, the vehicle data comprises datagrams transmitted over a bus by one or more vehicle computing systems (e.g., ECU devices). In some embodiments, the signals may be broadcast or multicast over the bus. In some embodiments, the bus is configured to communicate data signals or control signals, or both, between components of a computing system within the vehicle. In some embodiments, the bus comprises a vehicle bus, although other busses may be used. Examples include, but are not limited to, acceleration/braking data, ABS system events, collision sensor signals, stability control system messages, etc. In the illustrated embodiment, the event data includes raw event data from the vehicle bus. This raw data includes more data than that captured by existing black box systems. As one example, the method can collect data not normally processed by black box systems such as data generated by entertainment systems. In this example, data that indicates a user is manipulating an in-dash entertainment device or other center console device may be used to predict the likelihood of an accident. Similarly, the frequent re-calculating of directions or requests for map images by a central console may indicate that a user is focusing on a screen in the vehicle and not on the road. Generally, this type of data is not recorded by a black box recorder given the limited capacity of the buffer. Moreover, depending on the size of the buffer, this example of data may not be recorded as it may occur well before a collision. In some embodiments, this type of data may occur significantly before an accident and generally may indicate a driver is operating a vehicle in a risky manner although a collision may occur sometime after the initially detected events (e.g., thirty minutes). Thus, the use of raw events enables more holistic modeling of user behavior.

In block 204, the method classifies the vehicle data using an ML model.

In the illustrated embodiment, the ML model comprises a predictive model trained using classified data. In one embodiment, the ML model comprises a neural network such as an artificial neural network (ANN), convolutional neural network (CNN), recurrent neural network (RNN), auto encoder, etc. In the illustrated embodiment, the number of layers of the model may be configured based on experimentation and training. Alternatively, the predictive model may comprise a non-neural network such as a support vector machine (SVM), decision tree, or naïve Bayes classifier.

In the illustrated embodiment, the ML model is trained using classified event data. Specifically, event data generated by a vehicle are recorded and labeled based on known accidents (or lack of accidents). This labeled event data is then used to train the ML model which ultimately generates a set of weights (e.g., in the case of a neural network) and other model parameters. These parameters are then stored by the vehicle and used to predict whether current event data is indicative of an accident. In some embodiments, the vehicle can be configured to re-train the network based on captured event data and confirmed accidents. For example, if the ML model predicts an accident may occur, but later the prediction is identified as a false positive, the event data associated with the prediction can be properly classified and used to re-train the ML model.

Alternatively, or in conjunction with the foregoing, the ML models described above may be stored remotely. In this embodiment, a central server manages all ML models. Thus, when events are captured in block 202, these events are transmitted to a central server for classification. The central server then returns the classification result to the vehicle. In this manner, the system minimizes the total number of ML models and can centralize model training and re-training, thus rapidly improving the prediction accuracy of the model.

Alternatively, or in conjunction with the foregoing, the models generated by the central server can be distributed to the relevant vehicles. In this embodiment, the server can periodically update the in-vehicle ML models as the models are refined. In this manner, the central server can leverage the extensive data collected while individual in-vehicle models can be used for rapid prediction (including prediction in areas without access to wide area, e.g., cellular, networks).

In the illustrated embodiment, the output of the ML model is a risk level. In this embodiment, the risk level may comprise a binary value (e.g., high or low) or may comprise a continuous value (e.g., between 1 and 0).

In block 206, the method determines if the output of the ML model indicates a low or high risk of an accident occurring. In some embodiments, the classifying comprises classifying whether an extracted by a signal is likely to occur within a threshold level of confidence. In some embodiments, the threshold level of confidence is output by the ML model.

As described above, in some embodiments, the output of the ML is binary and thus the method determines which of the two labels were applied to the event data.

In other embodiments, the output of the ML model comprises a continuous value. In this scenario, the method may compare the value to a threshold to determine if further processing in block 208 should be performed. For example, the threshold may be 0.5 (50%). Thus, the method will only perform block 208 if the output of the ML model is equal to or over 0.5.

In another embodiment, the output of the ML model may comprise a label (e.g., high or low) and a confidence level associated with the label. In this embodiment, the method may only execute block 208 if the label indicates a high likelihood of an accident and the confidence is above a set threshold (e.g., 50%).

In another embodiment, the output of the ML model may comprise a risk likelihood (either discrete or continuous) and may also include a time until an accident may occur. In some embodiments, this time may be used to configure the recording properties of the LTS device (described below).

In block 208, the method stores vehicle data in long-term storage.

In one embodiment, the method stores all vehicle data transmitted on the bus in the long-term storage device for a specific duration (described below). In another embodiment, the method may only store a subset of all data based on identified subsystems. For example, the method may ignore some subsystems as irrelevant to accident prediction. In another embodiment, the method only stores data already processed and stored in a traditional black box's cyclic buffer as the long-term storage data. In the illustrated embodiment, the method is not practically limited by the size of the long-term storage. That is, the long-term storage may comprise a high capacity storage device such that recording of all data for a relatively limited duration (e.g., thirty minutes) is feasible, as compared to the limited cyclic buffer in the traditional black box.

In one embodiment, the ML model also predicts a time-to-accident (TTA) value. This TTA value can be learned from past accident data and may be used by the method to configure how long the method operates (as gated by block 212).

As illustrated, the method continues to store vehicle data in the long-term storage device until one of two conditions occur.

In block 210, the method determines if the first condition occurs. In the illustrated embodiment, the first condition comprises determining whether the vehicle was involved in an accident (e.g., a collision). In one embodiment, the method implements block 210 may monitoring the incoming event data and determining if any of the data indicates an accident. For example, the method can determine if data from collision sensors of a vehicle transmitted data. Alternatively, or in conjunction with the foregoing, the method can determine if any event data indicates that air bags were deployed.

In block 214, if the method determines that an accident has occurred, the method performs post-accident handling operations. In the illustrated embodiment, these operations may vary depending on the vehicle and, in some scenarios, the configuration of the system. In one embodiment, the method can automatically attempt to upload the entire contents of the long-term storage to a central server for archiving. This operation may require that the PBB be equipped with a dedicated cellular or satellite transceiver and battery. This hardware ensures that the PBB can upload data if the communications interfaces of the vehicle are not functioning. Alternatively, or in conjunction with the foregoing, the post-handling operations can include hardening the LTS to prevent tampering. For example, a golden encryption key can be used to encrypt the LTS after an accident occurs. In some embodiments, the LTS may always be encrypted. Alternatively, or in conjunction with the foregoing, the post-handling operations may comprise emptying the contents of the cyclic buffer into the LTS to ensure that all possible data has been recorded.

In block 216, the method updates the ML model using the event data in the LTS.

In the illustrated embodiment, since an accident was detected, the method can use the data in the LTS as training data, labeled as high risk. In some embodiments, the event data comprises a set of events. Each event is then labeled as high risk and the resulting two-element tuple (event, high risk) is used as training data. In some embodiments, the method may further add a TTA value to the tuple (event, TTA, high risk) to enable the ML model to predict how long before an accident will occur. To calculate the TTA, the method may use an existing timestamp of the event data. This timestamp may be included in the data transmitted over the bus or may be added by the method when receiving vehicle data in block 202. The method then computes the number of microseconds between the accident events (e.g., collision sensor values) and the event timestamp to generate the number of, for example, microseconds between the event and the accident.

In block 212, the method determines if a risk of an accident remains upon determining that no accident has yet occurred.

In some embodiments, block 212 may comprise counting down a preset timer. For example, the method may execute block 208 for one hour while no accident occurs. Alternatively, in some embodiments, the method may execute block 208 while there is storage capacity in the LTS. In this embodiment, the decision in block 212 is based on whether storage capacity remains and not the risk of a potential accident.

In another embodiment, the method dynamically evaluates how long to store data in block 208. In a first embodiment, the method receives an estimated TTA from the ML model. The method may then use this time to set the timer used in block 212. Thus, if the model predicts an accident in twenty minutes, the method will execute block 208 for at least twenty minutes. Similarly, in some embodiments where a TTA is not returned, the method may use the confidence level or likelihood of an accident as a metric for determining how long to store data in block 208. That is, for an unlikely accident, the method may only record data in block 208 for a limited time. In contrast, for a highly likely accident, the method may record data in block 208 for a longer time.

Ultimately, in block 212, the method will determine that a crash did not occur and data should no longer be recorded to the LTS, either because the risk has passed or there is no storage capacity left. In either case, the method then proceeds to block 218.

In block 218, the method disables long-term storage of vehicle data. In this step, the method disables any routines that are accessing the LTS and stops all future data recording temporarily (i.e., until the condition in block 206 is met).

In block 220, the method updates the ML model with negative data samples. In the illustrated embodiment, the procedure performed in block 220 is similar to that performed in block 216 and the specific details provided previously are not repeated herein. Specifically, the primary difference in block 220 is that the label assigned to any events is set to low or no likelihood of an accident. Additionally, the TTA value (if implemented) would be set to zero or null since no accident occurred. In the illustrated embodiment, the use of negative data samples increases the accuracy of the model. This is especially true when combined with positive data samples in 216.

In block 222, the method cleans the long-term storage. In some embodiments, this block is optional. If implemented, the method may clean the LTS by writing zeros or ones to all locations in data, effectively erasing all recorded data. In some embodiments, the method may also execute a self-test to determine if the LTS is functioning properly at this stage. The cleaning ensures that the integrity of data is not negatively impacted by remnant data.

In the illustrated embodiment, blocks 216 and 220 may be performed either by a vehicle or at a central location as described previously. Details regarding the re-training of a ML model are provided in the following FIGS. 3 and 4.

Figure 3:
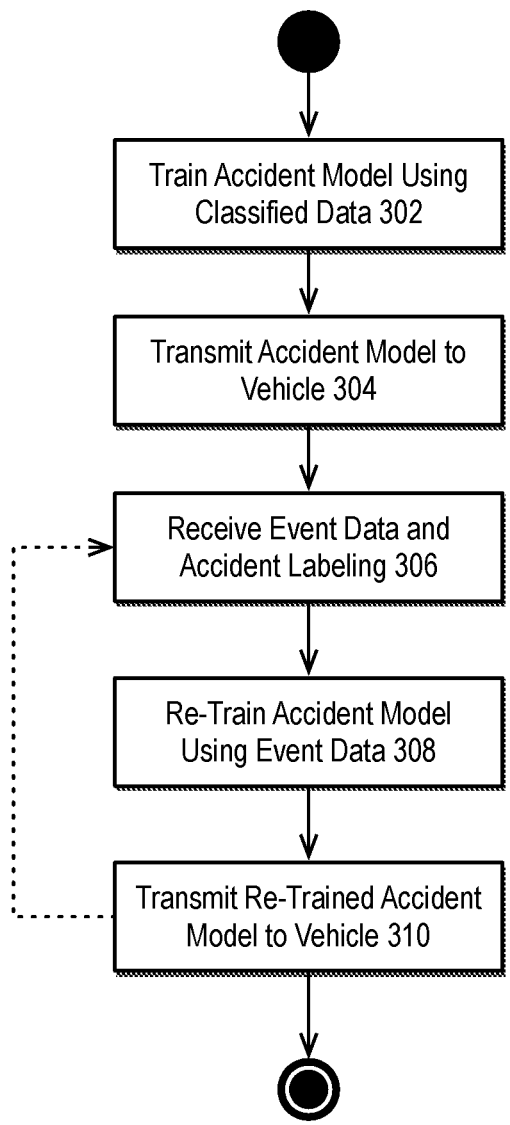
FIG. 3 is a flow diagram illustrating a method for re-training a machine learning model based on accident data according to some embodiments of the disclosure.

FIG. 3 is a flow diagram illustrating a method for re-training a machine learning model based on accident data according to some embodiments of the disclosure.

In block 302, the method trains an accident model using classified data.

In one embodiment, the method depicted in FIG. 3 can be implemented by a central server or other remote data system. In the illustrated embodiment, the classified data can comprise data points recorded by vehicles and associated with known accidents or with known non-accident events. In some embodiments, the data can be generated from traditional black boxes which are analyzed after an accident. Thus, the data in the black box buffers can be labeled as associated with an accident. In the illustrated embodiment, the method trains an ML model such as a neural network using the classified data.

In block 304, the method transmits the accident model to one or more vehicles.

In one embodiment, a central server can manage the generation of the ML model and distribute the ML model (e.g., model parameters) to any vehicles configured to receive such ML model data. In some embodiments, vehicles may be configured to periodically refresh the ML model. In other embodiments, the central server may be configured to push the ML model to vehicles after training.

In block 306, the method receives event data and accident labeling.

In the illustrated embodiment, the event data comprises data stored in a long-term storage device of a vehicle. As described, a vehicle may store this data after using the ML model transmitted in block 304 and predicting an accident. In some embodiments, the method receives a set of events and a flag indicating whether a collision or accident actually occurred. The method can use this flag to label all of the data accordingly. Thus, in block 306, the method obtains a new, labeled training dataset.

In some embodiments, the method can operate on raw event data. However, in other embodiments, the method may perform a normalization of data into a standard form. To this end, an extensible stylesheet language transformation (XSLT) or similar mechanism (e.g., parser) may be used to convert various formats of event data into a standard form. Thus, in some embodiments, the method can use data from multiple vehicles and multiple makes/models of equipment to train a single model for all vehicles.

In other embodiments, the method may generate separate models for each make and, in other embodiments, for each model of each make. In some embodiments, the method may generate a global model and use this global model to generate sub-models for each make and/or model. This ensures that makes/models with low volume still can utilize a robust global model.

In block 308, the method re-trains the model using the newly received data. This process may be performed in the same manner performed in block 302, albeit with new data.

In block 310, the method re-transmits the trained accident model to a vehicle. As with block 308, this block may be performed in a similar manner to that performed in block 304.

As indicated in the illustrated embodiment, blocks 306 through 310 may continuously performed during the life of the central server. That is, the central server may continuously re-train the model as new data is received. In some embodiments, this can be an on-demand process. In other embodiments, the method may build up labeled event data from vehicles and only re-train the models at regular intervals when enough data has been aggregated. In this manner, the method can provide a continuously refined model to vehicles based on actual data and reliable labeling techniques.

Figure 4:
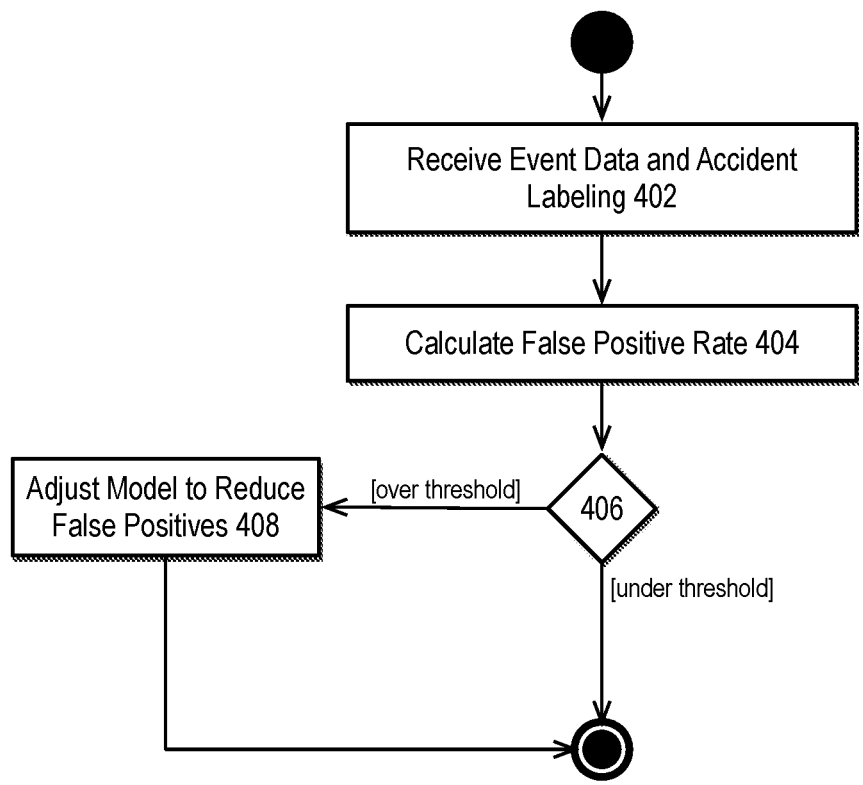
FIG. 4 is a flow diagram illustrating a method for optimizing a machine learning model based on false positive and negative events according to some embodiments of the disclosure.

FIG. 4 is a flow diagram illustrating a method for optimizing a machine learning model based on false positive and negative events according to some embodiments of the disclosure.

In block 402, the method receives event data and accident labeling from a vehicle or, in some embodiments, from data stored at a central server as described in FIG. 3. Details of event data and accident labeling are provided in previous figures and are not repeated herein.

In block 404, the method calculates a false positive rate. In the illustrated embodiment, a false positive rate can be computed by comparing the number of events that are labeled as not associated with an accident.

Specifically, the data received in block 402 comprises data stored in the LTS of a PBB device. This data is only recorded when an ML model predicts an accident will occur. As described in FIG. 2, this data is used to re-train the model and the labeling is generated based on whether an accident or collision was actually detected. As described in FIG. 3, this event and label data is transmitted to a central server for model re-training in some embodiments. Thus, the method in FIG. 4 has access to a set of events that are labeled as either occurring before an accident or not occurring before an accident. Since the data is only recorded when an accident is predicted, the events labeled as not occurring before an accident can be considered as false positives.

In the illustrated embodiment, the method may operate on a batch of events at a time. In some embodiments, this batch can be configured to analyze the performance characteristics of the system. For example, the method may execute on a year's worth of data or may execute on a set of data since the last execution of the method to quantify the performance of the ML models.

In block 406, the method determines if the false positive rate is over a preset threshold. In some embodiments, this threshold may be adjusted based on a cost factor for storing data in the LTS. That is, the threshold may be set to balance the costs (monetary and bandwidth) of storing event data versus the accuracy of the model. In the illustrated embodiment, the false positive rate can be calculated by computing the number of false positives over the total number of labelled events. If the false positive rate is less than the threshold, the method ends.

In block 408, the method adjusts the ML model to reduce false positives if the false positive threshold is over the threshold.

Various techniques may be employed to adjust the ML model. As one example, the false positive dataset may be analyzed to determine any trends in the data. In this example, a clustering algorithm may be used to cluster the data. The result of the clustering can then be used to identify prominent features that are associated with false positives. For example, the operation of a windshield wiper may be falsely correlated with an accident. In this case, the method can reduce the weighting for this feature. Alternatively, the method can specify that the entire feature should be ignored.

Alternatively, or in conjunction with the foregoing, various weights and functions of a neural network can be adjusted based on the false positive data. For example, based on the false positive rate, the method can adjust the activation function or loss function of the neural network accordingly. In some embodiments, this may comprise adjusting the parameters of the activation/loss functions and testing the ML model on the false positive data. Then, a set of properly classified data points can be tested with the updated ML model to confirm an improvement in the ML model.

In yet another embodiment, the method may provide evidence to support changing ML model techniques. For example, a CNN may be tested in lieu of an RNN and the performance of both models may be compared.

After adjusting the model and verifying an improvement in performance, the method ends and the updated model is then used as described in FIG. 3.

Figure 5:
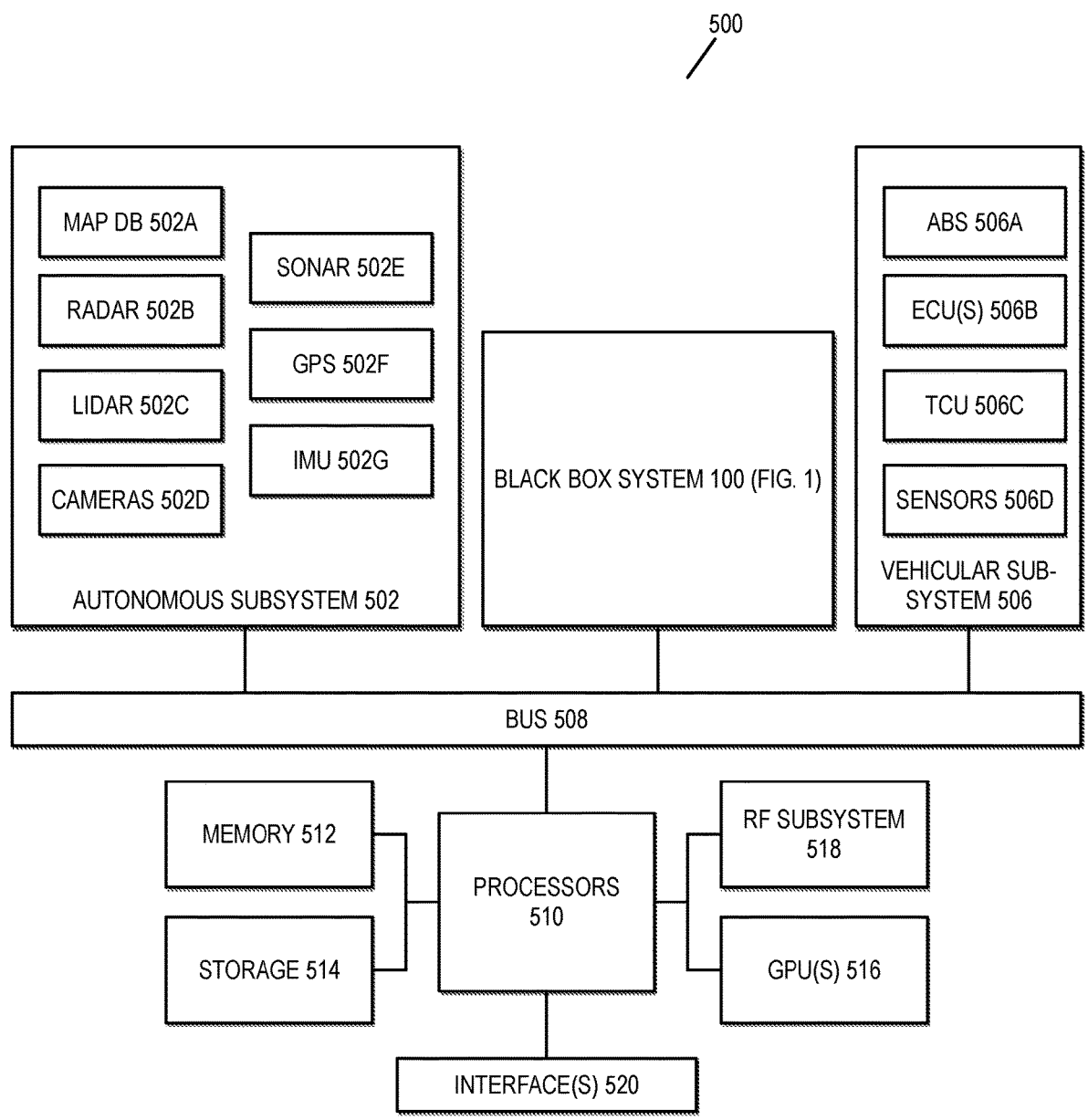
FIG. 5 is a block diagram illustrating a vehicular computing system according to some embodiments of the disclosure.

FIG. 5 is a block diagram illustrating a vehicular computing system according to some embodiments of the disclosure.

The system illustrated in FIG. 5 may be installed entirely within a vehicle. In some embodiments, some components (e.g., components and subsystems other than subsystem (100)) may comprise existing autonomous and non-autonomous vehicle subsystems.

The system optionally includes an optional autonomous vehicle subsystem (502). In the illustrated embodiment, autonomous vehicle subsystem (502) includes map database (502a), radar devices (502b), Lidar devices (502c), digital cameras (502d), sonar devices (502e), GPS receivers (502f), and inertial measurement units (502g). Each of the components of an autonomous vehicle subsystem (502) comprise standard components provided in most current autonomous vehicles. In one embodiment, map database (502a) stores a plurality of high-definition three-dimensional maps used for routing and navigation. Radar devices (502b), Lidar devices (502c), digital cameras (502d), sonar devices (502e), GPS receivers (502f), and inertial measurement units (502g) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality. In some embodiments the autonomous subsystem (502) is built into the vehicle while in other embodiments the autonomous subsystem (502) comprises an aftermarket system.

Vehicular subsystem (506) is additionally included within the system. Vehicular subsystem (506) includes various anti-lock braking systems (506a), engine control units (502b), and transmission control units (502c). These components may be utilized to control the operation of the vehicle in response to the data generated by autonomous vehicle subsystem (502) and/or black box system (100). The standard autonomous vehicle interactions between autonomous vehicle subsystem (502) and vehicular subsystem (506) are generally known in the art and are not described in detail herein.

The processing side of the system includes one or more processors (510), short-term memory (512), an RF system (518), graphics processing units (GPUs) (516), long-term storage (518) and one or more interfaces (520).

The one or more processors (510) may comprise central processing units, FPGAs, or any range of processing devices needed to support the operations of the autonomous vehicle. Memory (512) comprises DRAM or other suitable volatile RAM for temporary storage of data required by processors (510). RF system (518) may comprise a cellular transceiver and/or satellite transceiver. Long-term storage (514) may comprise one or more high-capacity solid-state drives (SSDs). In general, long-term storage (514) may be utilized to store, for example, high-definition maps, routing data, and any other data requiring permanent or semi-permanent storage. GPUs (516) may comprise one more high throughput GPU devices for processing data received from autonomous vehicle subsystem (502a). Finally, interfaces (520) may comprise various display units positioned within the autonomous vehicle (e.g., an in-dash screen).

The system additionally includes a black box system (100) which performs the operations required by the methods illustrated in the preceding Figures. Details of the black box system (100) are described more fully in FIG. 1 and the accompanying description of FIG. 1 is not repeated herein.

In some embodiments, it is to be understood that the steps of methods described above can be implemented as a continuous process such as each step can run independently by monitoring input data, performing operations and outputting data to the subsequent step. Also, such steps for each method can be implemented as discrete-event processes such as each step can be triggered on the events it is supposed to trigger and produce a certain output. It is to be also understood that each figure represents a minimal method within a possibly larger method of a computer system more complex than the ones presented in the description. Thus, the steps depicted in each figure can be combined with other steps feeding in from and out to other steps associated with a larger method of a more complex system.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors, and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
monitoring, via a first controller of a first storage device located in a vehicle and a second controller of a second storage device located in the vehicle, a communications bus for events generated during operation of the vehicle, the events comprising data signals or control signals between components of a computing system within the vehicle, wherein the events further comprise events generated by the vehicle during its operation and related to the operation of subsystems of the vehicle;
storing, by the first controller, the events in a cyclic buffer of the first storage device;
classifying, by the second controller, the events using a neural network stored in the second storage device, the neural network configured to accept one or more events as inputs and outputting a classification of the one or more events, the classification comprising a prediction that a collision between the vehicle and another object is likely to occur in the future, wherein the classification further comprises a likelihood that the collision will occur within a threshold level of confidence, the likelihood comprising a risk level assigned to the events by the neural network;
copying, by the second controller, events from the cyclic buffer into a long-term storage device of the second storage device in response to detecting that the risk level exceeds a pre-configured threshold, the long-term storage device comprising a tamper-proof storage device with error correction capabilities;

writing, by the second controller, second events transmitted over the communications bus to the long-term storage device, the second events generated after the events;
determining, by the second controller, that the collision occurred within a predefined time interval in the future;
labeling, by the second controller, the data stored in the long-term storage device based on whether an actual collision was detected after the classifying, wherein the label corresponds to a training risk level; and
re-training, by the second controller, the neural network using the data stored in the long-term storage device.

2. The method of claim 1, the monitoring events comprising receiving raw event data from a plurality of subsystems of the vehicle.

3. The method of claim 1, further comprising identifying a set of false positive and false negative events and adjusting parameters of the neural network based on the false positive and false negative events.

4. The method of claim 1, wherein the events comprise events selected from a group consisting of acceleration events, braking events, and electronic control unit alerts.

5. The method of claim 1, wherein the second controller includes a dedicated artificial intelligence processor executing the neural network.

6. A non-transitory computer-readable storage medium for tangibly storing computer program instructions capable of being executed by a computer processor, the computer program instructions defining steps of:
monitoring, via a first controller of a first storage device located in a vehicle and a second controller of a second storage device located in the vehicle, a communications bus for events generated during operation of the vehicle, the events comprising data signals or control signals between components of a computing system within the vehicle, wherein the events further comprise events generated by the vehicle during its operation and related to the operation of subsystems of the vehicle;
storing, by the first controller, the events in a cyclic buffer of the first storage device;
classifying, by the second controller, the events using a neural network stored in the second storage device, the neural network configured to accept one or more events as inputs and outputting a classification of the one or more events, the classification comprising a prediction that a collision between the vehicle and another object is likely to occur in the future, wherein the classification further comprises a likelihood that the collision will occur within a threshold level of confidence, the likelihood comprising a risk level assigned to the events by the neural network;
copying, by the second controller, events from the cyclic buffer into a long-term storage device of the second storage device in response to detecting that the predicted risk level exceeds a pre-configured threshold, the long-term storage device comprising a tamper-proof storage device with error correction capabilities;
writing, by the second controller, second events transmitted over the communications bus to the long-term storage device, the second events generated after the events;
determining, by the second controller, that the collision occurred within a predefined time interval in the future;
labeling, by the second controller, the data stored in the long-term storage device based on whether an actual collision was detected after the classifying, wherein the label corresponds to a risk level; and
re-training, by the second controller, the neural network using the data stored in the long-term storage device.

7. The non-transitory computer-readable storage medium of claim 6, the monitoring events comprising receiving raw event data from a plurality of subsystems of the vehicle.

8. The non-transitory computer-readable storage medium of claim 6, the instructions further defining the steps of identifying a set of false positive and false negative events and adjusting parameters of the neural network based on the false positive and false negative events.

9. The non-transitory computer-readable storage medium of claim 6, wherein the events further comprise events selected from a group consisting of acceleration events, braking events, and electronic control unit alerts.

10. An apparatus comprising:
a communications bus;
a first storage device located in a vehicle comprising a first controller and a cyclic buffer; and
a second storage device located in the vehicle comprising a second controller and a long-term storage device,
wherein the first controller is configured to:
monitor the communications bus for events generated during operation of the vehicle, the events comprising data signals or control signals between components of a computing system within the vehicle generated by the vehicle during its operation and related to the operation of the components, and
store the events in the cyclic buffer; and
wherein the second storage device is configured to:
monitor the communications bus for the events,
classify the events using a neural network stored in the second storage device, the neural network configured to accept one or more events as inputs and outputting a classification of the one or more events, the classification comprising a prediction that a collision between the vehicle and another object is likely to occur in the future, wherein the classification further comprises a likelihood that the collision will occur within a threshold level of confidence, the likelihood comprising a risk level assigned to the events by the neural network,
copy events from the cyclic buffer into the long-term storage device in response to detecting that the predicted risk level exceeds a pre-configured threshold, the long-term storage device comprising a tamper-proof storage device with error correction capabilities, and
write second events transmitted over the communications bus to the long-term storage device, the second events generated after the events;
determine that the collision occurred within a predefined time interval in the future;
label the data stored in the long-term storage device based on whether an actual collision was detected after the classifying, wherein the label corresponds to a training risk level; and
re-train the neural network using the data stored in the long-term storage device.

11. The apparatus of claim 10, wherein indicating that a collision is likely to occur in the future comprises identifying that the collision is likely to occur within a threshold level of confidence.

12. The apparatus of claim 10, wherein the second storage device is further configured to identify a set of false positive and false negative events and adjusting parameters of the neural network based on the false positive and false negative events.

13. The apparatus of claim 10, wherein the events further comprise events selected from a group consisting of acceleration events, braking events, and electronic control unit alerts.

14. The apparatus of claim 10, wherein the second controller includes a dedicated artificial intelligence processor executing the neural network.

* * * * *